United States Patent
Liu et al.

(10) Patent No.: US 11,637,395 B2
(45) Date of Patent: Apr. 25, 2023

(54) SOCKET STRUCTURE

(71) Applicant: Delta Electronics, Inc., Taoyuan (TW)

(72) Inventors: Hung-Chih Liu, Taoyuan (TW);
Wei-Kai Hsiao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 83 days.

(21) Appl. No.: 17/443,669

(22) Filed: Jul. 27, 2021

(65) Prior Publication Data
US 2022/0302626 A1    Sep. 22, 2022

(30) Foreign Application Priority Data
Mar. 22, 2021  (CN) ......................... 202110302580.X

(51) Int. Cl.
*H01R 13/66*    (2006.01)
*H01R 13/46*    (2006.01)
*H01R 12/71*    (2011.01)

(52) U.S. Cl.
CPC ........... *H01R 13/46* (2013.01); *H01R 12/716* (2013.01); *H01R 13/665* (2013.01)

(58) Field of Classification Search
CPC .... H01R 13/46; H01R 12/716; H01R 13/665; H01R 13/6658; H01R 24/76; H02G 3/18; H02G 3/081
See application file for complete search history.

(56) References Cited

U.S. PATENT DOCUMENTS

| 4,485,282 | A  | * | 11/1984 | Lee ........................ H02G 3/18 174/53 |
| 5,603,622 | A  | * | 2/1997  | Lin ..................... H01R 13/6658 439/116 |
| 6,198,631 | B1 | * | 3/2001  | Radosavljevic ... H05K 7/20509 174/16.3 |
| 7,234,954 | B1 |   | 6/2007  | Srage et al. |
| 11,172,595| B2 |   | 11/2021 | Adam et al. |

(Continued)

FOREIGN PATENT DOCUMENTS

CN    207442047 U    6/2018
CN    108430180 A    8/2018

(Continued)

*Primary Examiner* — Abdullah A Riyami
*Assistant Examiner* — Nelson R. Burgos-Guntin
(74) *Attorney, Agent, or Firm* — Kirton McConkie; Evan R. Witt

(57) ABSTRACT

The present disclosure provides a socket structure including a casing, a main body, a frame and a cover. The casing includes plural lateral walls, a bottom, an opening and an accommodation space. The opening is defined by the lateral walls. The accommodation space is defined by the lateral walls and the bottom and is in communication with the opening. The main body is disposed in the accommodation space and includes a circuit board and a connection port disposed on the circuit board. The frame includes at least one plate and a first extending portion. The plate surrounds the periphery of the opening. The first extending portion is extended from the plate and is connected to one of the lateral walls. The cover covers the opening and includes a through hole. The through hole is configured to allow a plug to pass through and connect to the connection port.

11 Claims, 5 Drawing Sheets

(56) References Cited

U.S. PATENT DOCUMENTS

| | | | |
|---|---|---|---|
| 2004/0110397 A1* | 6/2004 | Chen | H01R 13/6658 |
| | | | 439/75 |
| 2010/0132972 A1 | 6/2010 | Chaumeny et al. | |
| 2016/0198581 A1* | 7/2016 | Caille | H02G 3/18 |
| | | | 174/50 |
| 2019/0103699 A1* | 4/2019 | Yamanaka | H01R 13/665 |
| 2019/0393661 A1 | 12/2019 | Donia et al. | |
| 2020/0144745 A1* | 5/2020 | Lorenzo | H05K 5/0069 |
| 2022/0131291 A1* | 4/2022 | Chen | H01R 24/78 |
| 2022/0302626 A1* | 9/2022 | Liu | H01R 13/6658 |
| 2022/0360026 A1* | 11/2022 | Lin | H01R 13/502 |

FOREIGN PATENT DOCUMENTS

| | | |
|---|---|---|
| CN | 207994259 U | 10/2018 |
| DE | 102004007180 A1 | 9/2005 |
| EP | 3189567 B1 | 9/2019 |
| EP | 3605749 A1 | 2/2020 |
| JP | S57195879 U | 12/1982 |
| JP | H0672182 U | 10/1994 |
| JP | 2004165251 A | 6/2004 |
| JP | 2004187491 A | 7/2004 |
| JP | 2004234866 A | 8/2004 |
| JP | 2021162957 A | 10/2021 |
| TW | 369741 B | 9/1999 |

\* cited by examiner

SOCKET STRUCTURE

CROSS-REFERENCE TO RELATED APPLICATION

This application claims priority to China Patent Application No. 202110302580.X filed on Mar. 22, 2021, and entitled "SOCKET STRUCTURE", the entirety of which is hereby incorporated by reference.

FIELD OF THE INVENTION

The present disclosure relates to a socket structure, and more particularly to a socket structure that a metallic frame and a casing thereof are combined with each other.

BACKGROUND OF THE INVENTION

Power socket is an essential product for modern life as an electric power supply. Presently, USB connectors are commonly used transmission interfaces for charging the electronic devices. Therefore, it became a growing trend of setting USB ports on power sockets. As the rise of the market requirement of charging rate, the requirement of power increases. However, because the limitation of arrangements and sizes of the components inside the power sockets, local overheating frequently occurs to the power sockets with USB ports. Since the component damage owing to the overheating should be avoided, it is still hard to increase the total wattage carried by the power sockets with USB ports.

Therefore, there is a need of providing a socket structure so as to obviate the drawbacks encountered from the prior arts.

SUMMARY OF THE INVENTION

It is an object of the present disclosure to provide a socket structure for addressing the drawbacks of the prior art.

It is another object of the present disclosure to provide a socket structure. By the combination of the frame and the casing, the thermal conductivity of the socket structure is improved. As a result, the heat inside the socket structure can be efficiently conducted to the exterior of the socket structure to improve the heat dissipating effect, and the problem of local overheating can be obviated. It is beneficial to increase the total wattage carried by the socket structure and meet the requirement of high power in the market.

In accordance with an aspect of the present disclosure, there is provided a socket structure. The socket structure includes a casing, a main body, a frame and a cover. The casing includes plural lateral walls, a bottom, an opening and an accommodation space. The opening is collaboratively defined by the lateral walls. The accommodation space is collaboratively defined by the lateral walls and the bottom and is in communication with the opening. The opening and the accommodation space are in communication with each other. The main body is disposed in the accommodation space and includes a circuit board and a connection port. The connection port is disposed on the circuit board. The frame includes at least one plate and a first extending portion. The plate surrounds the periphery of the opening. The first extending portion is extended from the plate and is connected to one of the lateral walls. The cover covers the opening and includes a through hole. The through hole is configured to allow a plug to pass through and connect to the connection port.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
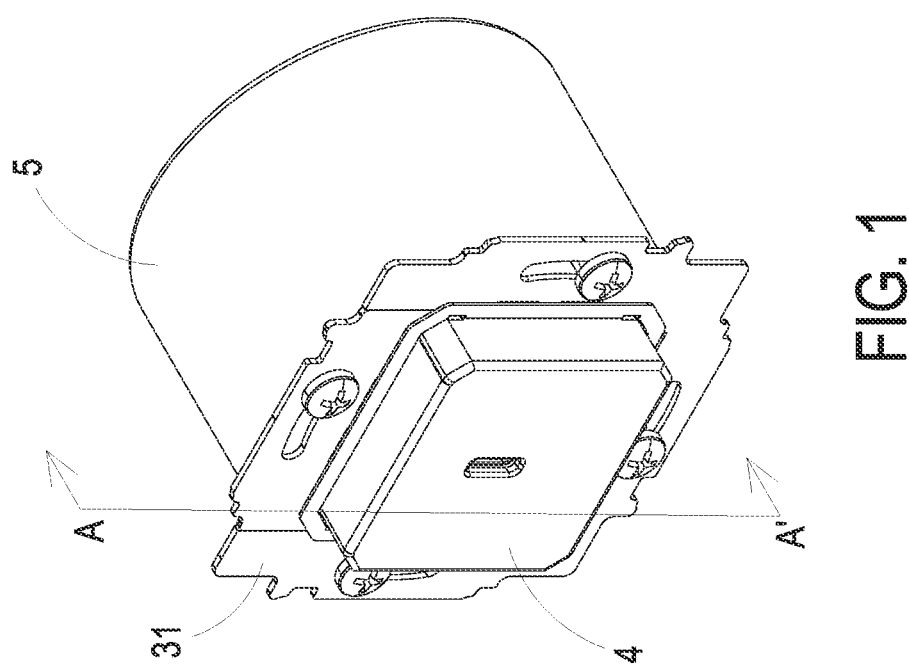
FIG. 1 is a schematic perspective view illustrating the socket structure according to a first embodiment of the present disclosure.
Figure 2:
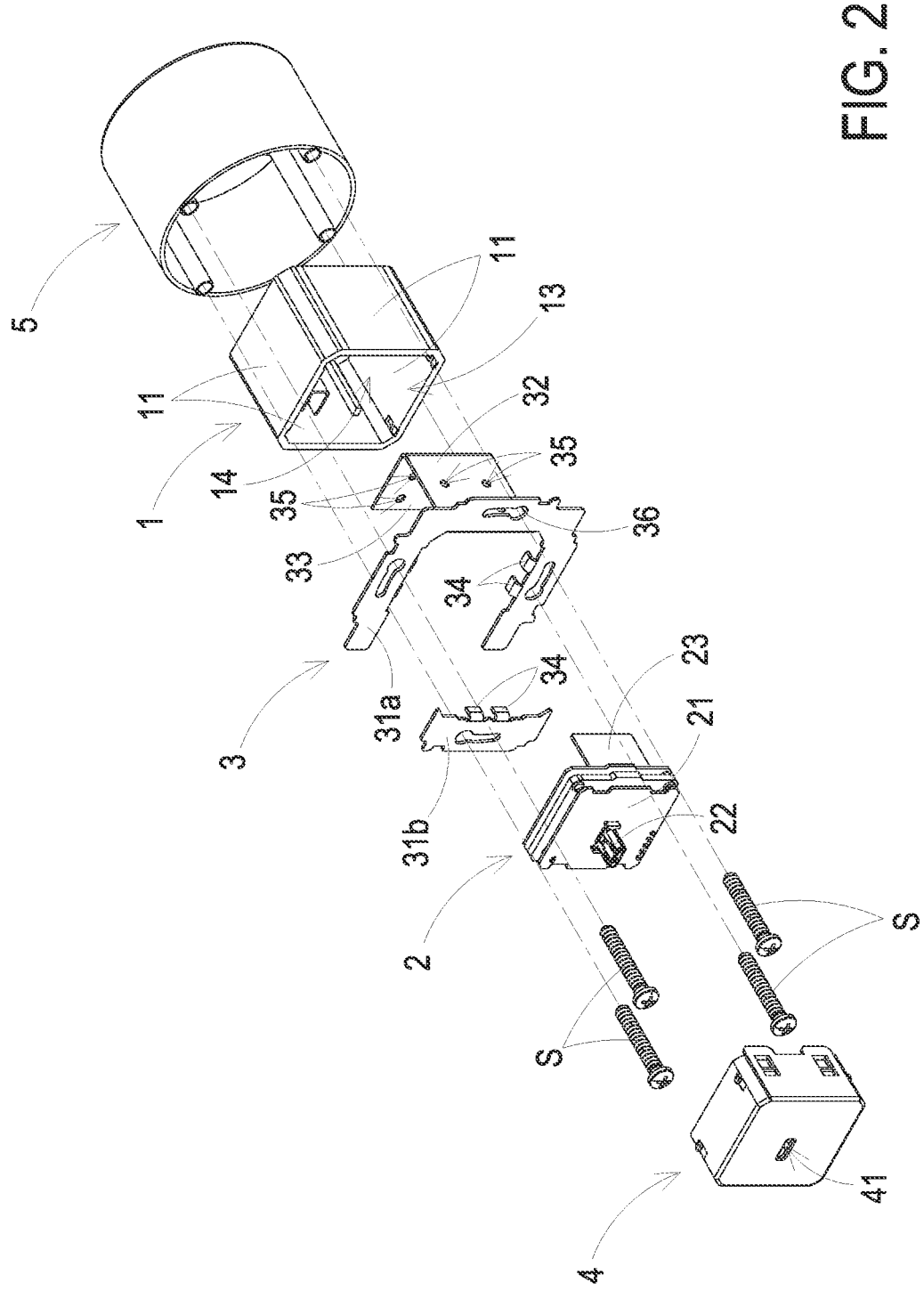
FIG. 2 is an exploded view illustrating the socket structure of FIG. 1.
Figure 3:
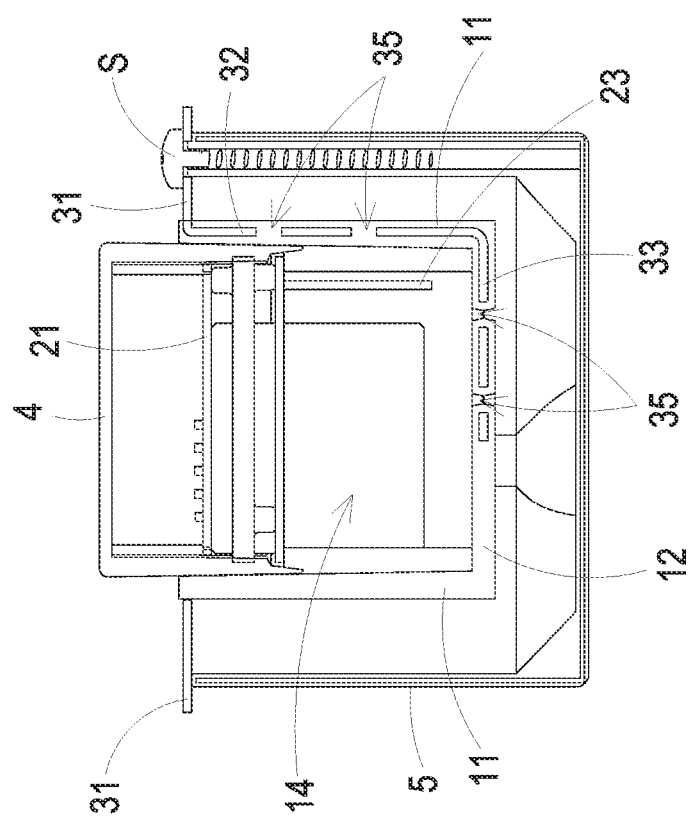
FIG. 3 is a cross-sectional view illustrating the socket structure along the section line A-A' of FIG. 1.

Please refer to FIGS. 1, 2 and 3. FIG. 1 is a schematic perspective view illustrating the socket structure according to a first embodiment of the present disclosure. FIG. 2 is an exploded view illustrating the socket structure of FIG. 1. FIG. 3 is a cross-sectional view illustrating the socket structure along the section line A-A' of FIG. 1. In this embodiment, the socket structure includes a casing 1, a main body 2, a frame 3 and a cover 4. The casing 1 includes plural lateral walls 11, a bottom 12, an opening 13 and an accommodation space 14. The opening 13 is collaboratively defined by the lateral walls 11. The accommodation space 14 is collaboratively defined by the lateral walls 11 and the bottom 12 and is in communication with the opening 13. The main body 2 is disposed in the accommodation space 14 and includes a circuit board 21 and a connection port 22. The connection port 22 is disposed on the circuit board 21. The frame 3 includes at least one plate 31 and a first extending portion 32. The plate 31 surrounds the periphery of the opening 13. The first extending portion 32 is extended from the plate 31 and is connected to one of the lateral walls 11. The cover 4 covers the opening 13 and includes a through hole 41. The through hole 41 is configured to allow a plug (not shown) to pass through and connect to the connection port 22. In this embodiment, the plug is a USB plug, and the connection port 22 is a USB port. The frame 3 is preferably but not exclusively made of metal, thereby improving the thermal conductivity of the socket structure. Consequently, the heat inside the socket structure can be conducted to the exterior, and thus the problem of local overheating is addressed.

In this embodiment, the casing 1 has a cube profile. That is, the casing 1 includes four lateral walls 11, and the opening 13 defined by the lateral walls 11 also has a square profile. In this embodiment, the thicknesses of the lateral walls 11 and the bottom 12 are ranged between 1.0 mm and 3.0 mm, but not limited thereto. The cover 4 is connected to the inner surfaces of the four lateral walls 11, so as to cover and seal the opening 13. In this embodiment, the frame 3 is preferably but not exclusively made of a metallic plate, and a thickness of the metallic plate is ranged between 0.5 mm and 2.0 mm. The frame 3 includes a first plate 31a and a second plate 31b. The first plate 31a has a U-shaped profile and includes three inner edges. The first plate 31a and the second plate 31b collaboratively surrounds the periphery of the opening 13, but not limited thereto. In some embodiments, the first plate 31a and the second plate 31b are integrally formed.

In this embodiment, the first extending portion 32 is extended from one of the inner edges of the first plate 31a. Preferably but not exclusively, the first extending portion 32 is extended from the inner edge of the first plate 31a which is opposite to the second plate 31b. In this embodiment, the frame 3 further includes a second extending portion 33. The second extending portion 33 is connected to the first extending portion 32, and the first extending portion 32 and the second extending portion 33 collaboratively form an L-shaped structure. The first extending portion 32 and the second extending portion 33 can be integrally formed by bending the metallic plate, but not limited thereto. In this embodiment, the first extending portion 32 and the second extending portion 33 are respectively embedded in one of the lateral walls 11 and the bottom 12 of the casing 1 by an insert molding process. In this embodiment, the frame 3 further includes a plurality of positioning holes 35. The positioning holes 35 are formed on the first extending portion 32 and the second extending portion 33, so that the material of the casing 1 can flow through the positioning holes 35 during the insert molding process. It is beneficial to position the first extending portion 32 and the second extending portion 33 inside the casing 1. In this embodiment, a diameter of each of the positioning holes 35 is ranged between 0.5 mm and 1.0 mm, but not limited thereto. Thereby, the frame 3 and the casing 1 are combined with each other, and the thermal conductivity of the casing 1 is improved. Meanwhile, the steps of installing the socket structure are reduced, and the assembly cost thereof is reduced accordingly.

In this embodiment, the frame 3 further includes a plurality of third extending portions 34. The third extending portions 34 are extended from the first plate 31a and the second plate 31b and are connected to the lateral walls 11 of the casing 1. In this embodiment, the third extending portions 34 are preferably but not exclusively embedded in the lateral walls 11 by the insert molding process, so that the frame 3 is firmly combined and fixed with the casing 1. In this embodiment, the frame 3 includes six third extending portions 34, but not limited thereto. Four of the third extending portions 34 are disposed on the first plate 31a. More specifically, two of the third extending portions 34 are disposed on each of the inner edges of the first plate 31a except the inner edge where the first extending portion 32 is extended from. Two of the third extending portions 34 are disposed on the second plate 31b.

Figure 4:
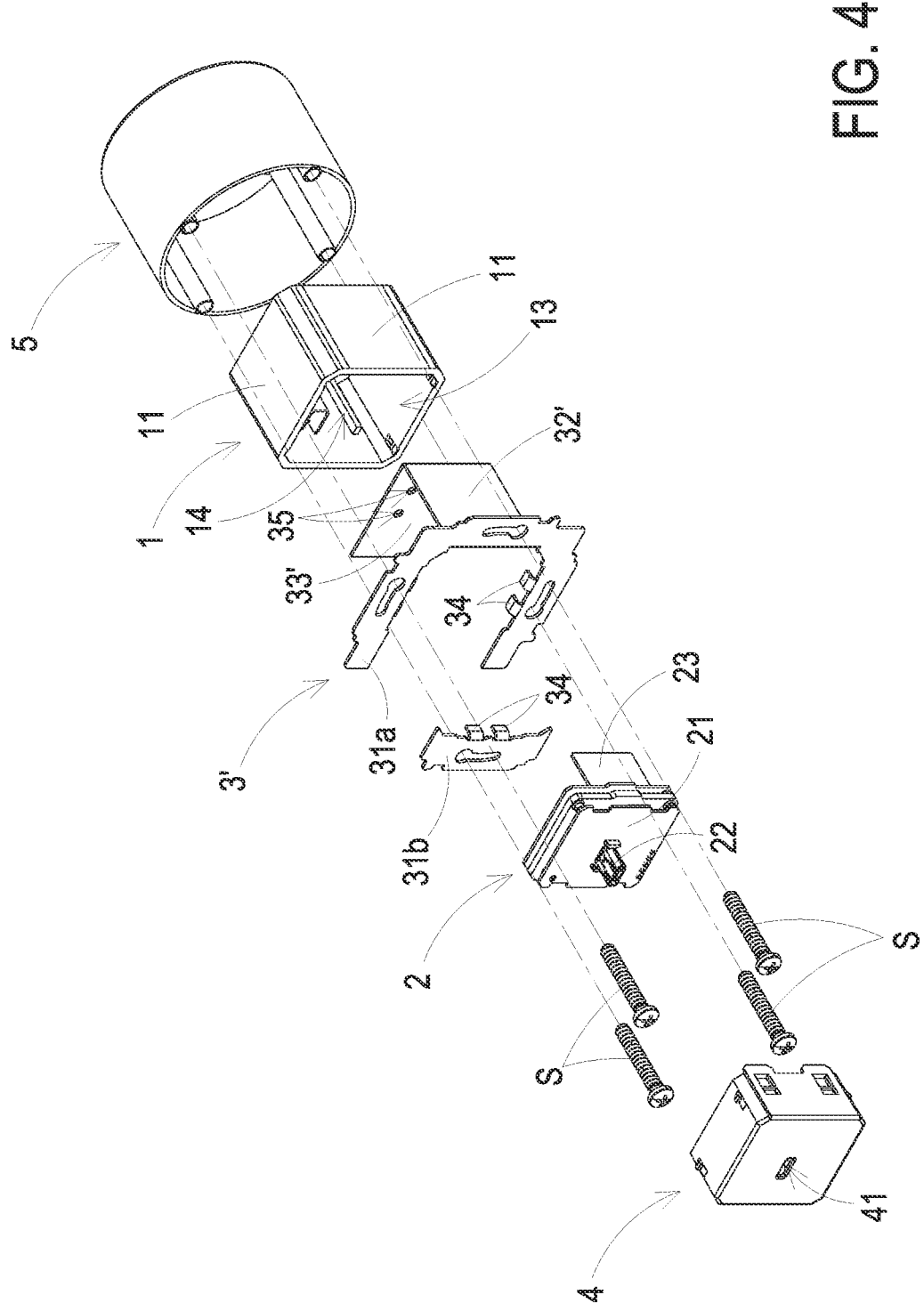
FIG. 4 is an exploded view illustrating the socket structure according to a second embodiment of the present disclosure.
Figure 5:
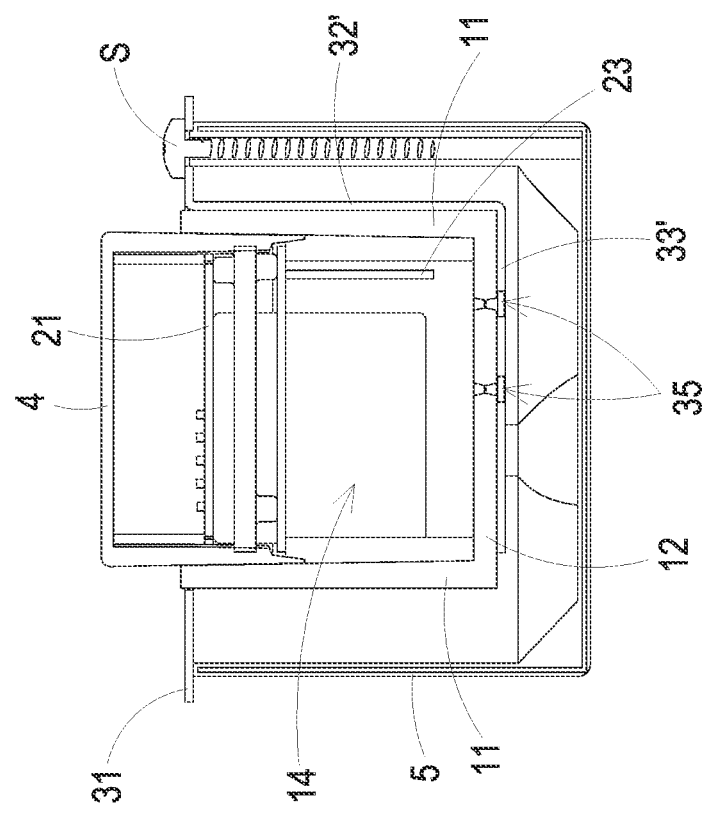
FIG. 5 is a cross-sectional view illustrating the socket structure of FIG. 4.

Please refer to FIGS. 4 and 5. FIG. 4 is an exploded view illustrating the socket structure according to a second embodiment of the present disclosure. FIG. 5 is a cross-sectional view illustrating the socket structure of FIG. 4. The main difference between the first embodiment and the second embodiment is the combination way of the frame 3' and the casing 1. Therefore, the similar structures of the main body 2 and the cover 4 are not redundantly described here. In this embodiment, the first extending portion 32' and the second extending portion 33' are respectively attached on outer surfaces of one of the lateral walls 11 and the bottom 12. The third extending portions 34 are embedded in the lateral walls 11, but not limited thereto. In some embodiments, the third extending portions 34 are attached on the outer surfaces of the lateral walls 11. In this embodiment, the positioning holes 35 is only formed on the second extending portion 33', but not limited thereto.

In this embodiment, the socket structure further includes an insulating covering 5. The insulating covering 5 covers and accommodates the lateral walls 11, the bottom 12, the first extending portion 32' and the second extending portion 33', so as to achieve the insulating effect. In this embodiment, the socket structure further includes four fixing components S. The frame 3' further includes four fixing grooves 36. The fixing grooves 36 are formed on the first plate 31a and the second plate 31b. The fixing components S pass through the fixing grooves 36 and are connected to the insulating covering 5, so that the frame 3' and the casing 1 are combined and fixed with the insulating covering 5.

In the first embodiment and the second embodiment, the socket structure further includes a glue layer (not shown). The glue layer is filled between the bottom 12 of the casing 1 and the lower surface of the circuit board 21 of the main body 2, so that the thermal conductivity of the socket structure is further improved. In addition, the main body 2 further includes a heat conducting component 23. The heat conducting component 23 is preferably but not exclusively a plate structure. The heat conducting component 23 is connected to the circuit board 21 and is extended from the circuit board 21 toward the bottom 12 of the casing 1. In other words, the extending direction of the heat conducting component 23 is parallel to the extending direction of the first extending portions 32, 32' of the frames 3, 3', but not limited thereto. In some embodiments, the heat conducting component 23 is directly in contact with the first extending portions 32, 32'. In other embodiments, the glue layer is filled between the heat conducting component 23 and the first extending portions 32, 32' of the frames 3, 3'. Thereby, the heat generated by the connection port 22 of the main body 2 is efficiently conducted to the frames 3, 3' and the casing 1 through the heat conducting component 23. Consequently, the effect of heat dissipating is further improved.

From the above descriptions, the present disclosure provides a socket structure. By the first extending portion, the second extending portion and the third extending portions, the frame and the casing are firmly combined with each other. As a result, the effect of heat dissipating of the socket structure is improved, and the problem of local overheating is avoided. In addition, the steps of installing the socket structure are reduced, and the assembly cost thereof is reduced accordingly.

While the disclosure has been described in terms of what is presently considered to be the most practical and preferred embodiments, it is to be understood that the disclosure needs not be limited to the disclosed embodiment.

What is claimed is:
1. A socket structure, comprising:
a casing comprising a plurality of lateral walls, a bottom, an opening and an accommodation space, wherein the opening is collaboratively defined by the plurality of lateral walls, and the accommodation space is collaboratively defined by the plurality of lateral walls and the bottom and is in communication with the opening;
a main body disposed in the accommodation space and comprising a circuit board and a connection port, wherein the connection port is disposed on the circuit board;

a frame comprising at least one plate and a first extending portion, wherein the at least one plate surrounds the periphery of the opening, and the first extending portion is extended from the at least one plate and is connected to one of the plurality of lateral walls; and a cover covering the opening and comprising a through hole, wherein the through hole is configured to allow a plug to pass through and connect to the connection port, wherein the frame further comprises a second extending portion, and the second extending portion is connected to the first extending portion and connected to the bottom of the casing, and the first extending portion and the second extending portion are respectively embedded in one of the plurality of lateral walls and the bottom of the casing.

2. The socket structure according to claim 1, wherein the first extending portion and the second extending portion are respectively embedded in one of the plurality of lateral walls and the bottom of the casing by an insert molding process.

3. The socket structure according to claim 1, wherein the frame further comprises a plurality of positioning holes formed on at least one of the first extending portion and the second extending portion.

4. The socket structure according to claim 1, wherein the frame further comprises a plurality of third extending portions, and the plurality of third extending portions are extended from the at least one plate and connected to the plurality of lateral walls.

5. The socket structure according to claim 4, wherein the third extending portions are embedded in the plurality of lateral walls by an insert molding process.

6. The socket structure according to claim 1, wherein the frame comprises a first plate and a second plate, wherein the first plate has a U-shaped profile, the first plate and the second plate collaboratively surrounds the periphery of the opening, and the first extending portion is extended from an inner edge of the first plate.

7. The socket structure according to claim 1, further comprising an insulating covering, wherein the first extending portion is attached on an outer surface of one of the plurality of lateral walls, and the insulating covering covers and accommodates the plurality of lateral walls, the bottom and the first extending portion.

8. The socket structure according to claim 1, wherein the plug is a USB plug, and the connection port is a USB port.

9. The socket structure according to claim 1, wherein the frame is made of metal.

10. The socket structure according to claim 1, further comprising a glue layer, wherein the glue layer is filled between the bottom of the casing and the circuit board of the main body.

11. The socket structure according to claim 1, wherein the main body further comprises a heat conducting component, and the heat conducting component is connected to the circuit board and is extended from the circuit board toward the bottom of the casing.

* * * * *